UNITED STATES PATENT OFFICE.

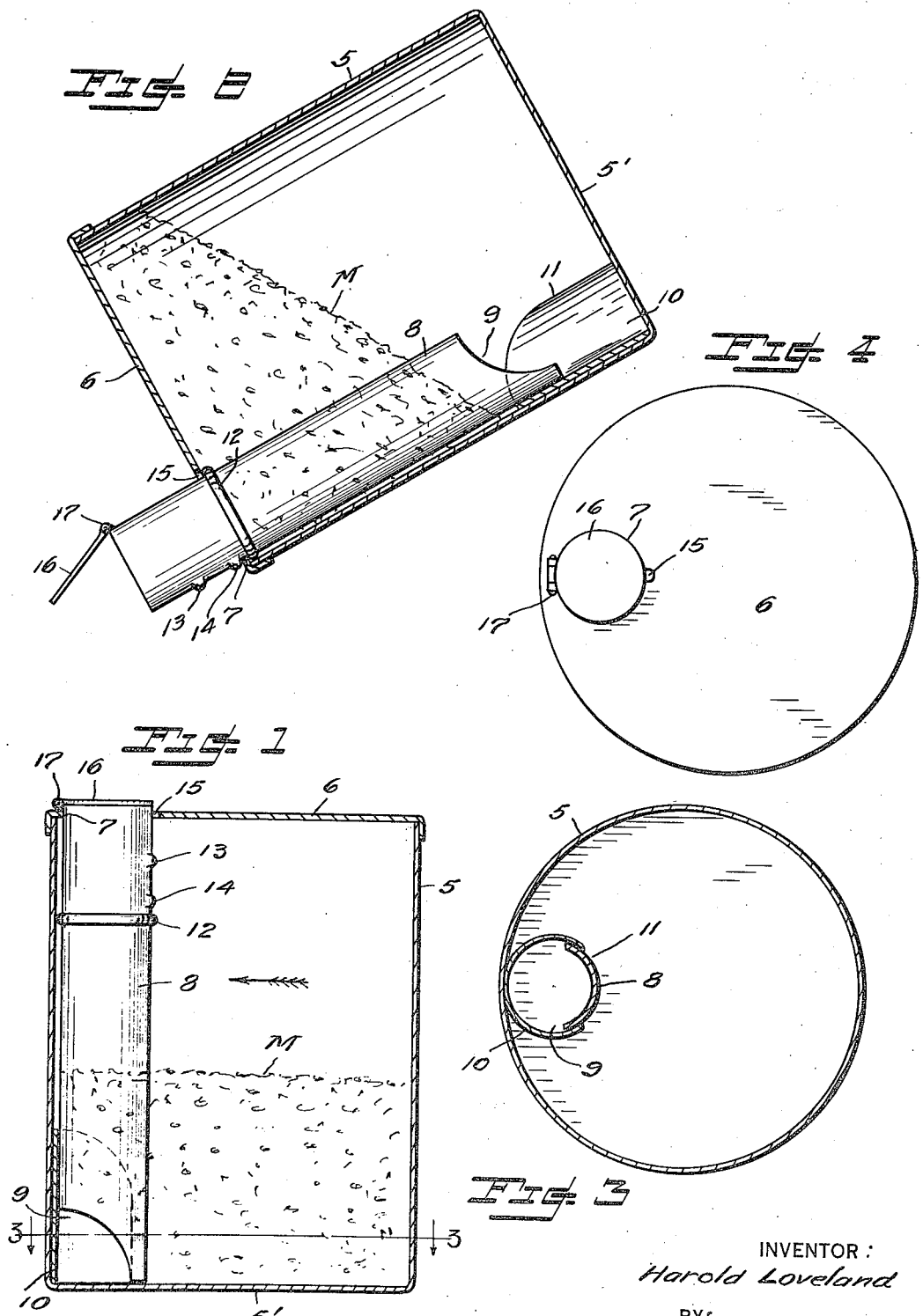
H. LOVELAND.
MEASURING AND DISPENSING DEVICE.
APPLICATION FILED NOV. 14, 1917.
1,276,382.
Patented Aug. 20, 1918.
INVENTOR:
Harold Loveland
BY
Pierre Barnes
ATTORNEY

HAROLD LOVELAND, OF BREMERTON, WASHINGTON.

MEASURING AND DISPENSING DEVICE.

1,276,382.　　　　　　Specification of Letters Patent.　　Patented Aug. 20, 1918.

Application filed November 14, 1917. Serial No. 201,892.

*To all whom it may concern:*

Be it known that I, HAROLD LOVELAND, a citizen of the United States, residing at Bremerton, in the county of Kitsap and State of Washington, have invented certain new and useful Improvements in Measuring and Dispensing Devices, of which the following is a specification.

This invention relates to dispensing and measuring devices, and is intended, more particularly, for use in dispensing sugar, coffee or other material.

The object is to provide apparatus of this character which will be of simple and inexpensive construction and adapted to be adjusted to automatically discharge a predetermined quantity of material at each of its complete operative movements.

The invention consists in the novel construction, adaptation and combination of parts, as will be hereinafter described and claimed.

In the accompanying drawings, Fig. 1 is a longitudinal vertical section through apparatus embodying the present invention, with the various parts in inoperative positions. Fig. 2 is a similar view, the apparatus being shown inverted and the dispensing devices in operative positions. Fig. 3 is a sectional view through 3—3 of Fig. 1; and Fig. 4 is a top plan view of Fig. 1.

The reference numeral 5 designates a can or jar having a tight fitting cover 6. Extending through a hole 7 of the cover and adjacent to its periphery is a circular tube 8 of a length to extend from a short distance above said cover to the bottom $5^1$ of the jar, as shown in Fig. 1. Both ends of said tube are open, the lower end being also cut away or formed to provide a side inlet 9 which is coextensive with the bottom opening. Rigidly secured to the peripheral wall of said jar and disposed in axial alinement with the cover opening 7 is a guard or casing 10 which is provided with a socket to receive the lower end of said tube. Said guard does not, however, extend entirely around the tube, but affords a side opening 11 toward the axis of the jar.

The tube 8 is provided at a distance from its upper end with a circumferential ridge 12 whose office is to limit the withdrawal of the tube from the jar cover by encountering the underside of the same.

Protuberances 13 and 14 are provided in spaced relations on said tube above the ridge 12 and, in order to enable the protuberance being drawn through the cover, the latter is provided with a notch or recess 15 extending from the cover hole 17 at the side toward the jar axis.

16 represents a lid for the upper end of the tube, said lid being hingedly connected, as by a pivotal pin 17, to the tube at diametrically opposite sides from the positions of the protuberances 13 and 14.

When the parts of the apparatus are in the relative positions in which they are illustrated in Fig. 1 as, for example, during transportation or storage, the tube 8 is in contact with the bottom of the jar and the side inlet 9 of the tube is masked by the guard 10.

When the apparatus is to be used for dispensing small quantities of material the tube may be turned; but for greater amounts the tube is turned and also partly withdrawn from the jar, the protuberance for this purpose, being accommodated by the cover notch 15. After being withdrawn to a selected distance, the tube is rotatably moved to have the hinged part of the lid directed toward the axis of the jar 5.

In thus turning the tube, the side opening 9 thereof is presented to the opening 11 of casing 10 so that when the jar is tilted in the direction of arrow in Fig. 1, a quantity of the material will enter the lower end of the tube, and which may be poured or discharged therefrom when the jar is further tilted into the Fig. 2 position. The amount of material which will enter the tube will depend upon the effective size of the opening into the lower end of the tube, and the capacity of the casing 10 below the tube.

To regulate the amounts of material to be discharged the tube is simply turned or raised more or less with respect to the jar bottom $5^1$, the protuberances 13, 14 being located at suitable distances apart in order that when one or the other is brought to bear against the outside of the cover 6, definite quantities as, for example, two or three spoonfuls, will be delivered in each complete operation of the apparatus.

The invention may be employed for dispensing a variety of material or substances, is very convenient for supplying small quantities as required, and excludes dirt and other foreign substances from the material.

What I claim, is—

1. In a measuring and dispensing apparatus, the combination with a vessel and a cover therefor provided with an aperture, of a tube open at both ends and movable axially in the cover aperture, a guard provided in the vessel and into which said tube extends, said guard being provided with a side opening for the admission of material from the jar into the lower end of the tube.

2. In a measuring and dispensing apparatus, the combination with a vessel, a cover therefor having an aperture, of a tube extending into said receptacle and rotatably and axially movable in said aperture, the end of the tube within the receptacle having an opening in its side, a guard provided within the vessel to receive an end of said tube, said guard having an opening in its side for the passage of material into the tube, and means provided on the tube and coöperating with said cover for regulating the capacity of the tube in each operation.

3. In a measuring and dispensing apparatus, the combination with a vessel, a hollow guard therein provided with a side opening, and a cover for said vessel, said cover being provided with a hole, a tube open at both ends and extending through the cover hole into said guard, said tube having within the guard a side opening which is adapted to be brought into or out of register with the aforesaid guard opening by suitably turning the tube, and means provided on the tube and engageable with said cover for regulating the position of the tube for dispensing predetermined quantities of material.

4. In a measuring and dispensing apparatus, the combination with a vessel, a hollow guard therein provided with a side opening, and a cover for said vessel, said cover being provided with a hole, a tube open at both ends and extending through the cover hole into said guard, said tube having within the guard a side opening which is adapted to be brought into or out of register with the aforesaid guard opening by suitably turning the tube, a hinged lid for the outer open end of the tube, and means to limit the extent of the tube's withdrawal from the vessel.

Signed at Seattle, Washington, this 6th day of November, 1917.

HAROLD LOVELAND.

Witnesses:
PIERRE BARNES,
E. PETERSON.